March 10, 1964 HANS-DIETER SCHNEIDER 3,124,716
ARRANGEMENT FOR THE COMPENSATION OF SPURIOUS VOLTAGES
IN IMAGE PICKUP TUBES OF THE VIDICON TYPE
Filed Sept. 29, 1960

Inventor:
Hans-Dieter Schneider
by Michael S. Striker
Attorney

United States Patent Office 3,124,716
Patented Mar. 10, 1964

3,124,716

ARRANGEMENT FOR THE COMPENSATION OF SPURIOUS VOLTAGES IN IMAGE PICKUP TUBES OF THE VIDICON TYPE

Hans-Dieter Schneider, Darmstadt, Germany, assignor to Fernseh G.m.b.H., Darmstadt, Germany Filed Sept. 29, 1960, Ser. No. 59,260
Claims priority, application Germany Oct. 8, 1959
5 Claims. (Cl. 315—10)

Figure 1:
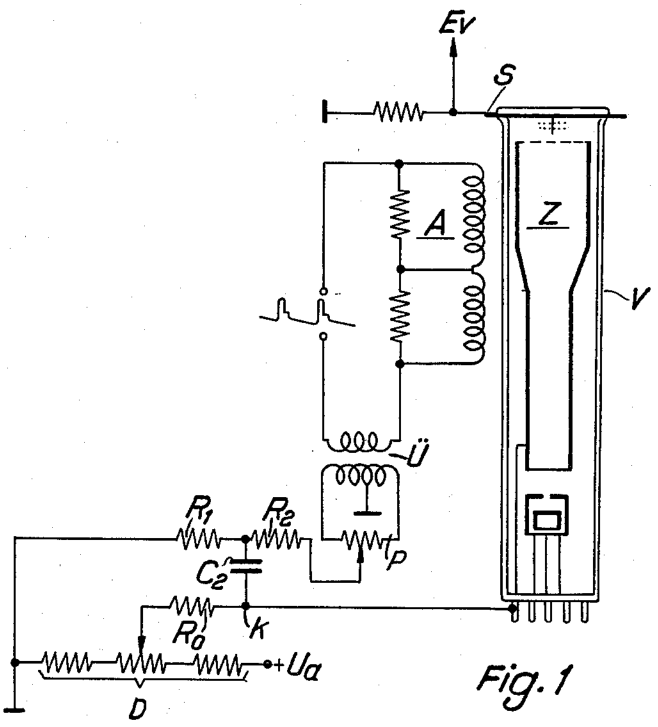

In vidicon cameras, spurious impulses which arise from the line flyback in the blanking intervals of the video signal, give rise as is known to great difficulties in the maintenance of the black level. This is due to the fact that the voltages in the line deflection coils during the flyback may amount to 1000 v. and more, while the signal voltage on the siganl electrode of the tube, lying within the deflection field, is of the order of magnitude of 0.1 v. Therefore it has been atempted to prevent spread of the spurious signals from spreading into the amplifier input. Up to now, however, this has still not been attained to a sufficient degree. Complete suppression of the interference is particularly necessary when the black amplitude appearing on the signal electrode during the beam blanking is made use of for fixing a black level.

Certain causes of the spread of said spurious signals and ways of abolishing it have already been known. One cause consists mainly in the possibility of a spread of the spurious voltages through the capacitance formed by the horizontal deflection coils to the pickup contact and to the signal lead. The other cause concerns in vidicons with divided anodes and is the possibility of a spread by way of the inductances of the electrode system.

It was known that an arrangement of the pickup contacts in the plane of symmetry of the line deflection coils and as small as possible a capacitance of the same produce a substantial diminution of the interference.

Since tubes of the style with divided anodes are now hardly ever employed, the invention deals mainly with vidicon tubes with undivided anodes, in which the paths of the spread are different so that necessarily means for its compensation must also be different. In contrast to tubes with divided anodes, in the tubes with undivided anodes no interfering signal passes by way of the anode system to the signal lead. The anode system is situated on the mean axis of the deflection fields, so that the deflection currents induced in the anode cylinder compensate themselves and thus give no rise to an interfering voltage. The system is also at earth potential for alternating voltages, so that small asymmetries have hardly any influence on the interfering signal, as has been found by experimentation and research.

The interfering signal accordingly results through direct inductive and capacitive action of the deflection coils on the surroundings of the signal electrode. Provided that the signal connection and the pickup contact are arranged in the manner described, these components need no longer be considered as causing a spread of the interfering signal. An interfering signal still remaining can thus arrive in the amplifier channel only by way of the signal electrode.

With the help of screening, which extends well over the front part of the tube—thus over the signal electrode—this interference also can be abolished. This measure, however, in fact counteracts the desire to extend the deflection field as far as possible to the signal electrode, in order to obtain optimum conditions for the raster geometry. Such screening also contributes to an undesirable degree to the increase of the stray capacitance of the signal electrode.

Under these circumstances, correction can be obtained only by compensation. A process has already been known in which the compensating signal is fed into the amplifier input through a condenser. This process is in general unsuitable, since this capacitance is an additional load on the amplifier input and it is known that it is necessary and desirable to make the amplifier input as free from capacitance as possible. In addition a structional modification of this kind entails further possibilities of spread.

In a vidicon camera circuit, in which the interfering voltages originating in the flyback peaks of the deflection field and effective at the amplifier input are suppressed by a compensating voltage shifted 180° in phase, in accordance with the invention a load resistance is now connected in the direct current lead to the anode of the vidicon and the compensating voltage proportional to the interfering voltage, taken from the tapping of a low-impedance voltage divider, is applied to this resistance so that the compensating voltage passes via the capacitance between the signal electrode and the anode to the amplifier input and compensates the interfering voltage there present. The advantage is thus attained that no increase occurs in the capacitance of the signal electrode and variations in the amplitude of the interfering signal resulting from asymmetries which may be present can easily be eliminated by adjusting the compensating voltage with regard to phase and amplitude.

The condenser serving as a bypass for the alternating voltages spreading to the anode of the tube is advantageously connected to ground through a resistance so low that the filter effect of the condenser is still maintained and the anode is at ground potential for alternating voltage, and the compensating voltage is fed in at this resistance.

Figure 2:
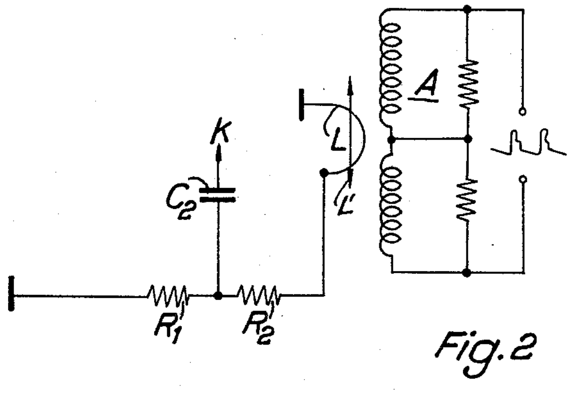

To explain the invention the FIGS. 1 and 2, which show two exemplary embodiments, are referred to. Similar circuit elements are provided in the figures with like reference characters.

In FIG. 1, the signal electrode S of a vidicon V is connected with the amplifier input $E_v$. There occurs a spread of the flyback voltages appearing in the winding of the deflection system A, mainly to the signal electrode S. To compensate this interference a flyback voltage shifted 180° in phase is taken from the secondary winding of the transformer Ü lying in the deflection current circuit, and the voltage drop in the resistance $R_1$ of the voltage divider $R_1$, $R_2$ is applied to the anode Z by way of the coupling condenser $C_2$. The anode is connected by way of the load resistance $R_0$ with the supply unit producing the auxiliary voltage $U_a$ by way of a further voltage divider or potentiometer D. The anode Z, the capacitor $C_2$ and the load resistance $R_0$ are connected with each other at the junction point K. The resistance $R_1$ is of only a few ohms magnitude, e.g. 10 ohms, so that the decoupling effect of the condenser $C_2$ on the disturbing voltages contained in the anode voltage is not deleteriously affected.

The compensating voltage taken from the transformer Ü passes therefrom via potentiometer P and elements $C_2$, Z and the internal capacitance $C_1$ between signal electrode S and anode Z to the amplifier input $E_v$. At the tapping of the transformer Ü the necessary amplitude may be obtained in the correct phase and the interference superimposed on the flyback potential is thus abolished.

In FIG. 2 which is a modified portion of the circuit of FIG. 1 is shown another way of obtaining the compensating voltage. Here there is indicated by L a conductive loop which is rotatably mounted on a rotatable support L′ in the field of the horizontal deflection coil system A and serves to derive therefrom inductively the compensating voltage while allowing adjustment of amplitude and phase thereof by movement of the loop in relation to the plane of symmetry of the line coil system. Again the voltage drop in the resistance $R_1$ of the voltage divider $R_2$, $R_1$ is applied to the anode Z, but in this case via coupling condenser $C_2$ connected between the tapping point of the voltage divider $R_2$, $R_1$ and the junction point K (FIG. 1) between anode Z and load resistance $R_0$.

What is claimed as new and desired to be secured by Letters Patent is:

1. Vidicon camera circuit comprising in combination a vidicon tube, a line deflection circuit including deflection coils surrounding the tube, an anode circuit comprising means for applying a D.C. voltage to the anode of the vidicon tube, a variable resistance network in said anode circuit, means for deriving from said line deflection circuit an auxiliary voltage which contains the peaks occurring during the flyback stroke of the line deflection and means for applying said auxiliary voltage to the junction between the vidicon anode and said resistance network, so that flyback peaks occurring on the output electrode of the vidicon tube due to capacitive coupling between the deflection coils and the output electrode are compensated by opposite voltage variations at the vidicon anode.

2. Vidicon camera circuit comprising, in combination, a vidicon tube, a line deflection circuit including deflection coils surrounding the tube, an anode circuit comprising a potentiometer in circuit with a source of D.C. voltage, and a coupling resistance connected between the tap of said potentiometer and the anode of the tube, means for deriving from said line deflection circuit an auxiliary voltage which contains the peaks occurring during the flyback stroke of the line deflection and means for applying said auxiliary voltage to the junction between the vidicon anode and the resistance network constituted by said potentiometer and said coupling resistance, so that flyback peaks occurring on the output electrode of the vidicon tube due to capacitive coupling between the deflection coils and the output electrode are compensated by opposite voltage variations at the vidicon anode.

3. Vidicon camera circuit comprising, in combination, a vidicon tube, a line deflection circuit including deflection coils surrounding the tube, an anode circuit comprising means for applying a D.C. voltage to the anode of the vidicon tube, a variable resistance network in said anode circuit, inductive means for deriving from said line deflection circuit an auxiliary voltage which contains the peaks occurring during the flyback stroke of the line deflection and means for applying said auxiliary voltage to the junction between the vidicon anode and said resistance network, said inductive means comprising a transformer arranged with its primary winding in series with said line deflection coils, a coupling condenser being arranged so as to couple the secondary winding of said transformer with the anode of the vidicon tube, so that flyback peaks occurring on the output electrode of the vidicon tube due to capacitive coupling between the deflection coils and the output electrode are compensated by opposite voltage variations at the vidicon anode.

4. Vidicon camera circuit comprising, in combination, a vidicon tube, a line deflection circuit including deflection coils surrounding the tube, an anode circuit comprising a variable resistance network consisting of a first potentiometer in circuit with a source of D.C. voltage and of a resistance connected between the tap of said potentiometer and the anode of the vidicon tube, inductive means for deriving from said line deflection circuit an auxiliary voltage which contains the peaks occurring during the flyback stroke of the line deflection and means for applying said auxiliary voltage to the junction between the vidicon anode and said resistance network, means comprising a transformer arranged with its primary winding in series with said line deflection coils, the secondary winding thereof being coupled with the anode of the vidicon tube, a second potentiometer being connected in circuit with said secondary winding, and a coupling condenser being connected between the tap of said second potentiometer and the anode of the tube, so that flyback peaks occurring on the output electrode of the vidicon tube due to capacitive coupling between the deflection coils and the output electrode are compensated by opposite voltage variations at the vidicon anode.

5. Vidicon camera circuit comprising, in combination, a vidicon tube, a line deflection circuit including deflection coils surrounding the tube, an anode circuit comprising means for applying a D.C. voltage to the anode of the vidicon tube, a variable resistance network in said anode circuit, inductive means for deriving from the line deflection field produced by said line deflection coils an auxiliary voltage which contains the peaks occurring during the flyback stroke of the line deflection, said inductive means comprising a loop of wire rotatably supported near said deflection coils, means for altering the position of said loop relative to said deflection coils in order to adjust the phase and amplitude of said auxiliary voltage, and means for applying the voltage induced in said wire loop to the junction between the vidicon anode and said resistance network, so that flyback peaks occurring on the output electrode of the vidicon tube due to capacitive coupling between the deflection coils and the output electrode are compensated by opposite voltage variations at the vidicon anode.

References Cited in the file of this patent

UNITED STATES PATENTS 1,981,322 Nakajima et al. ---------- Nov. 20, 1934